United States Patent
Wang (10) Patent No.: US 6,641,456 B2
(45) Date of Patent: Nov. 4, 2003

(54) INDEPENDENT WHEEL ARRANGEMENT FOR TOY VEHICLE

(76) Inventor: Jar Chen Wang, 16320 Bloomfield Ave., Cerritors, CA (US) 90703

( * ) Notice: Subject to any disclaimer, the term of this patent is extended or adjusted under 35 U.S.C. 154(b) by 0 days.

(21) Appl. No.: 10/038,366

(22) Filed: Oct. 18, 2001

(65) Prior Publication Data

US 2003/0077974 A1 Apr. 24, 2003

(51) Int. Cl.[7] ......................... A63H 17/16; A63H 17/18; A63H 17/21
(52) U.S. Cl. ..................... 446/440; 446/431; 446/465; 280/87.021
(58) Field of Search ................................. 446/95, 313, 6, 446/396, 440, 431, 448, 465, 466, 469; 180/282, 62; 280/87.1, 87.021; 16/30

(56) References Cited

U.S. PATENT DOCUMENTS 3,827,719 A * 8/1974 Lohr et al. .................. 280/259
4,079,957 A * 3/1978 Blease ......................... 280/278
4,714,261 A * 12/1987 Kassai ......................... 280/7.1
6,089,586 A * 7/2000 Rudell et al. ............... 280/282

* cited by examiner

*Primary Examiner*—Derris H. Banks
*Assistant Examiner*—Bena B. Miller
(74) *Attorney, Agent, or Firm*—Raymond Y. Chan; David and Raymond Patent Group (57) ABSTRACT

A toy vehicle incorporates with an independent wheel arrangement which includes a supporting leg having an upper inserting portion. The toy vehicle includes a vehicle frame having a through hole to define a top and bottom securing surfaces. The inserting portion of the supporting leg has a base portion and a shank portion to define a biasing shoulder therebetween. The inserting portion of the supporting leg is inserted into the through hole of the vehicle frame until the biasing shoulder is biased against the bottom securing shoulder of the through hole. A wheel is rotatably mounted at a bottom portion of the supporting leg. A locker member is securely attaching to the shank portion of the supporting leg with the through hole and biased against the top securing shoulder of the through hole, so as to securely mount the supporting leg to the vehicle frame.

31 Claims, 7 Drawing Sheets

INDEPENDENT WHEEL ARRANGEMENT FOR TOY VEHICLE

BACKGROUND OF THE PRESENT INVENTION

1. Field of Invention

The present invention relates to a toy vehicle, and more particularly to an independent wheel arrangement for toy vehicle, which can substantially increase the supporting area of the toy vehicle to evenly distribute and support the downward twisting force and stress applied by the rider's weight.

2. Description of Related Arts

A conventional toy vehicle, such as a twist vehicle, is considered as a popular amusement during outdoor activities. The conventional toy vehicle comprises a vehicle frame, a wheel assembly comprising at least two wheels rotatably connected to the vehicle frame, and a steering unit for controlling the movement of the toy vehicle.

The conventional method of attaching the wheels to the vehicle frame is to affix one end of a supporting axle to a center of the wheel and another end to the vehicle. This means that the wheels are substantially supported the vehicle frame and a downward force of the user's weight. When the user, such as a young child, drives the toy vehicle, the downward force is substantially exerted on the wheels. At the same time, each of the wheels causes an outward pulling force that will be distorted at the supporting axle. Especially for the twist vehicle, not only a rotational force but also a slidably tearing force are exerted on each wheel, so that the wheel will be bent easily. In other words, the stress will be created at the connection between the wheel and the vehicle frame, which will permanently misshapen at the stress point of continued use.

Moreover, in order to enhance the stabilization of the toy vehicle, the wheels must be spaced apart with each other as far as possible to define the wheel length therebetween. When the center of mass of the rider falls out of the wheel length, the vehicle frame will be flipped over easily. However, the wheel length is normally limited by the width of the vehicle frame such that the vehicle frame must be enlarged its size to increase the wheel length. The problem with this type of conventional toy vehicle is that it is bulky, usually very heavy, and difficult to carry. Thus, the rider may have difficulty to control the bulky toy vehicle.

SUMMARY OF THE PRESENT INVENTION

A main object of the present invention is to provide an independent wheel arrangement for toy vehicle, which can substantially increase the supporting area of the toy vehicle to evenly distribute and support the downward twisting force and stress applied by the rider's weight.

Another object of the present invention is to provide an independent wheel arrangement for toy vehicle, wherein a wheel length between two driving wheels is substantially increased by two supporting legs outwardly extended from two sides of the vehicle frame without increasing the width of the vehicle frame, so as to enhance the stabilization of the toy vehicle while moving.

Another object of the present invention is to provide an independent wheel arrangement for toy vehicle, wherein the attachment of the independent wheel arrangement with the vehicle frame is easy, fast and rigid, that is simply by inserting the supporting leg into a supporting sleeve provided on the vehicle frame and then securely locking by a locker member.

Another object of the present invention is to provide an independent wheel arrangement for toy vehicle, wherein the stress arm is extended from the supporting leg to the vehicle frame so as to minimize the torque on the supporting leg. In other words, the independent wheel arrangement of the present invention is more rigid and capable of supporting more weight in comparison with the conventional toy vehicle having the same frame structure and size.

Another object of the present invention is to provide an independent wheel arrangement for toy vehicle, wherein the wheel is substantially supported by an axle unit in a rotatably movable manner so as to prevent the wheel from being distorted by any external force, such as the rotational force or the slidably tearing force.

Another object of the present invention is to provide an independent wheel arrangement for toy vehicle, which does not require to alter the original structural design of the vehicle frame so as to minimize the manufacturing cost of the vehicle frame incorporating with the independent wheel arrangement.

Accordingly, in order to accomplish the above objects, the present invention provides an independent wheel arrangement for a toy vehicle which comprises a vehicle frame having at least a through hole to provide a top securing shoulder and a bottom securing shoulder at two opening ends of the through hole, and a seat frame mounted on the vehicle frame and positioned above the through hole.

The independent wheel arrangement comprises:

a supporting leg having an upper inserting portion and a bottom portion, wherein the inserting portion of the supporting leg has a base portion and a shank portion upwardly extended therefrom to define a biasing shoulder radially extended between the base portion and the shank portion, wherein said inserting portion of said supporting leg is fittedly inserted into the through hole of the vehicle frame until the biasing shoulder is biased against said bottom securing shoulder of the through hole so as to hold the supporting leg in position;

a wheel rotatably mounted at the bottom portion of the supporting leg;

a locker member securely attaching to the shank portion of the supporting leg with the through hole so as to securely mount the supporting leg to the vehicle frame; and a supporting shaft downwardly extended from the seat frame wherein a bottom portion of the supporting shaft is coaxially engaged with the locker member so as to substantially support the supporting leg to the vehicle frame.

DETAILED DESCRIPTION OF THE PREFERRED EMBODIMENT

Figure 1:
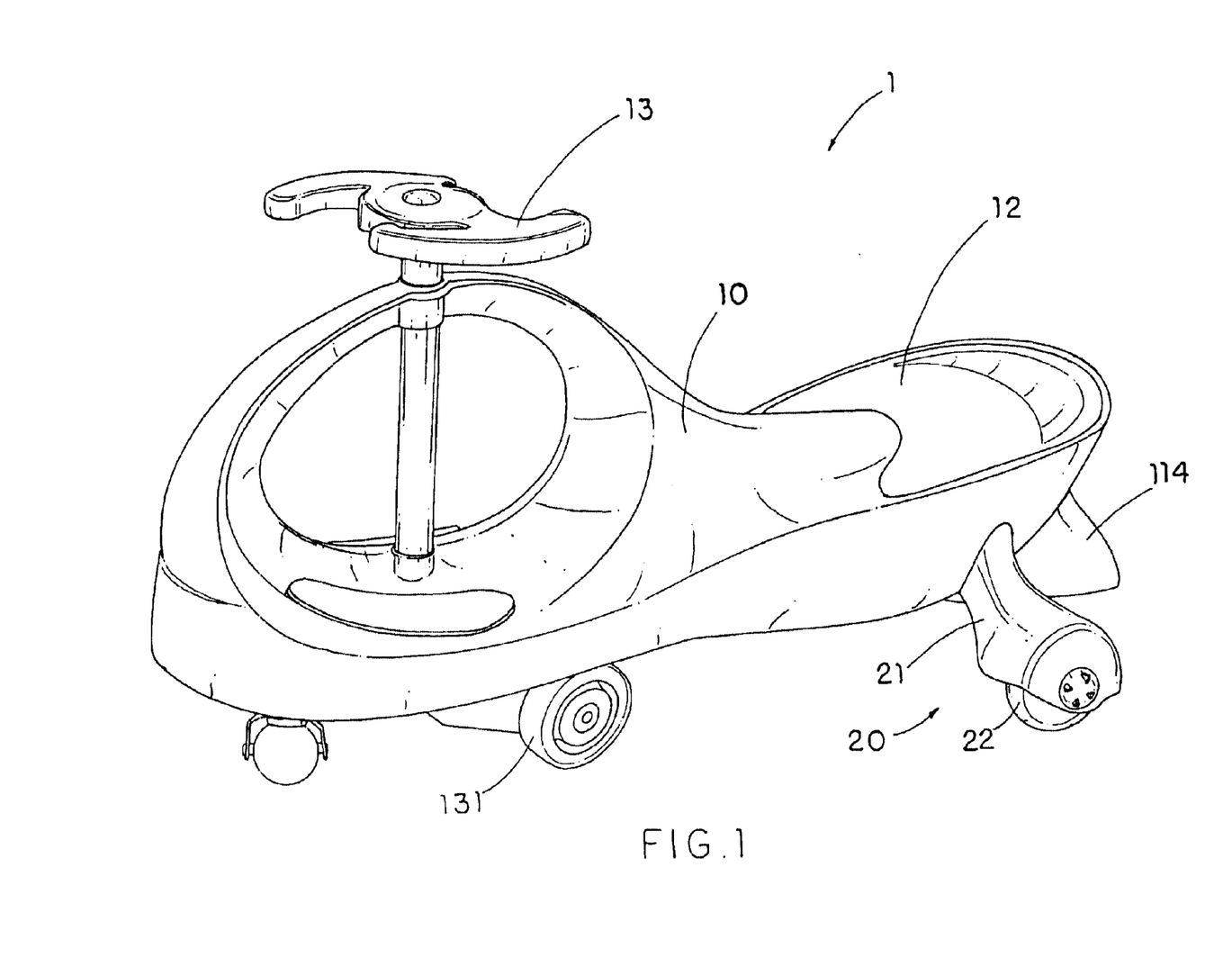
FIG. 1 is a perspective view of a toy vehicle incorporated with an independent wheel arrangement according to a preferred embodiment of the present invention.
Figure 2:
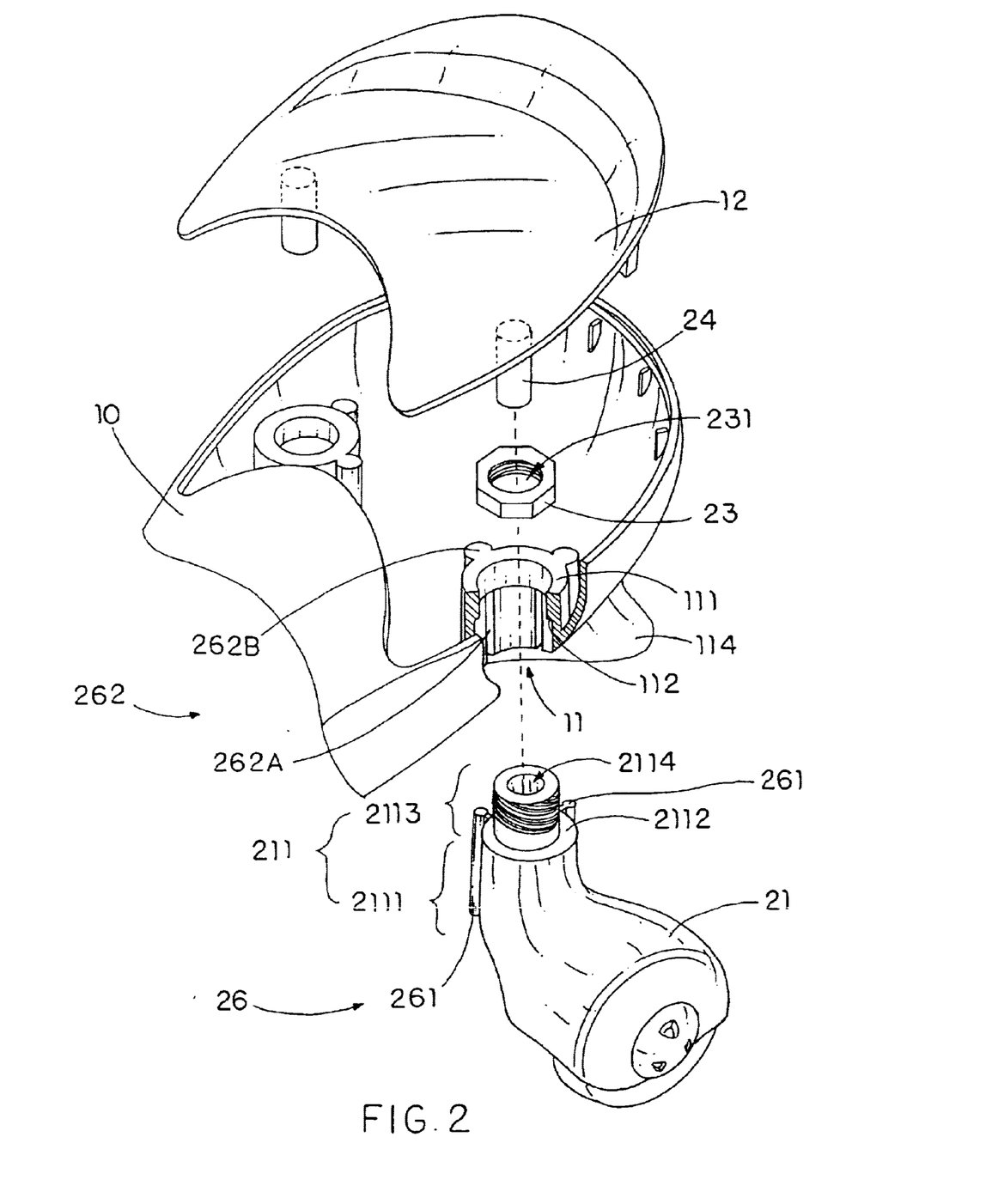
FIG. 2 is an exploded perspective view of the independent wheel arrangement for toy vehicle according to the above preferred embodiment of the present invention.

Referring to FIGS. 1 and 2 of the drawings, a toy vehicle 1 incorporated with an independent wheel arrangement 20 according to a first preferred embodiment of the present invention is illustrated. The toy vehicle 1, such as a conventional toy vehicle, comprises a vehicle frame 10 comprising at least a through hole 11 to provide a top securing shoulder 111 and a bottom securing shoulder 112 at two opening ends of the through hole 11. The toy vehicle 1 further comprises a seat frame 12 mounted on the vehicle frame 11 and positioned above the through hole 11 thereof, and a steering unit 13, comprising at least a driving wheel 131, for steering the movement of the vehicle frame 10.

As shown in FIG. 2, the independent wheel arrangement 20 comprises a supporting leg 21 having an upper inserting portion 211 fittedly inserted into the through hole 11 of the vehicle frame 10 and a bottom portion 212, a wheel 22 rotatably mounted at the bottom portion 212 of the supporting leg 21, and a locker member 23 securely attaching to the inserting portion 211 of the supporting leg 21 with the through hole 11.

According to the preferred embodiment, the inserting portion 211 of the supporting leg 21 has a base portion 2111 and a shank portion 2113 upwardly extended therefrom to define a biasing shoulder 2112 between the base portion 2111 and the sank portion 2113 wherein the inserting portion 211 is fittedly inserted into the through hole 11 until the biasing shoulder 2112 is biased against the bottom securing shoulder 112 of the through hole 11, so as to securely mount the supporting leg 21 to the vehicle frame 10.

Figure 3:
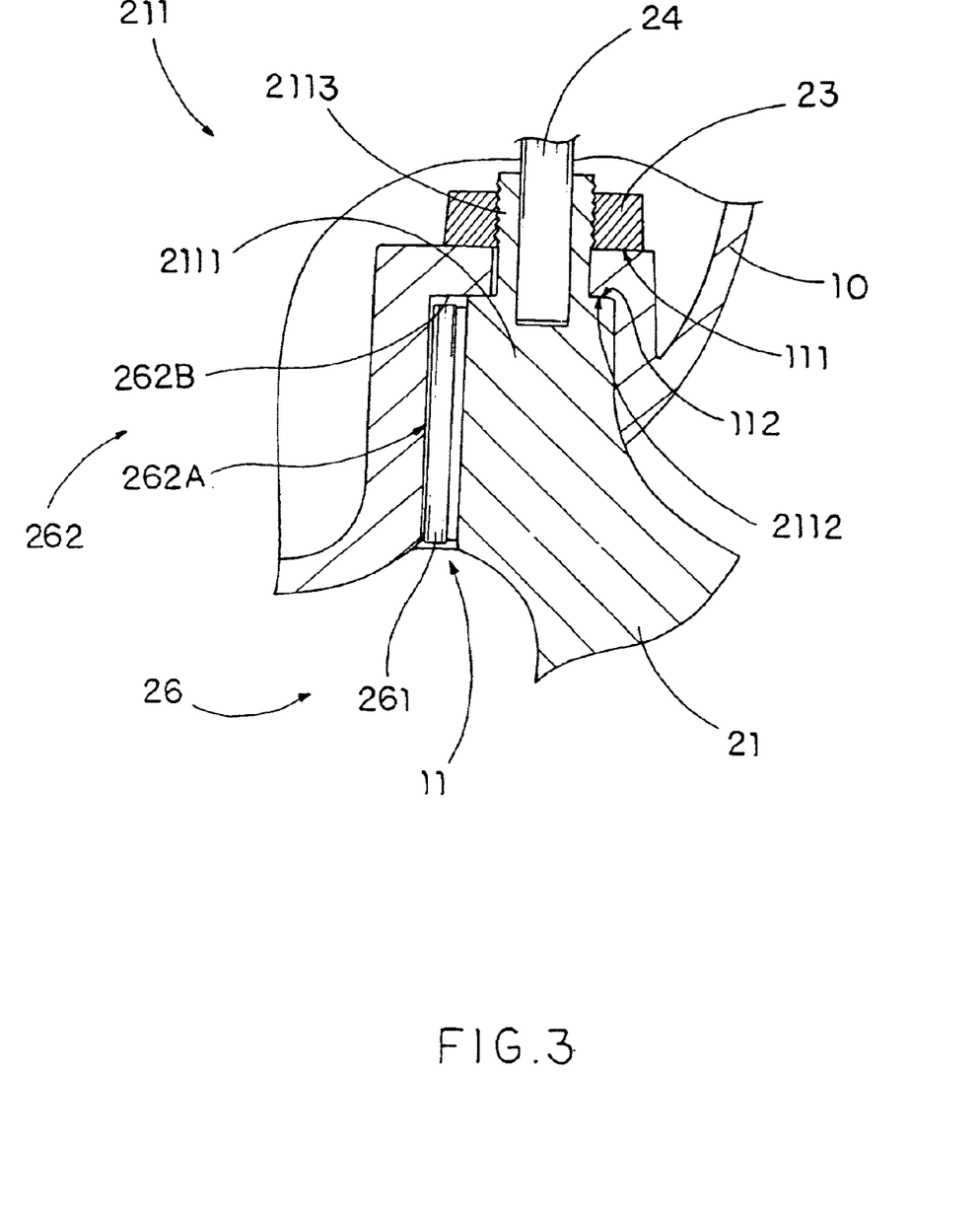
FIG. 3 is a sectional view of the independent wheel arrangement mounted to the toy vehicle according to the above preferred embodiment of the present invention.

The locker member 23 has a coaxial threaded hole 231 for screwing onto the shank portion 2113 of the supporting leg 21 at an outer surface thereof until the locker member 23 biases against the top securing shoulder 111 of the through hole 11 so as to fasten the inserting portion 21 of the supporting leg 21 with the through hole 11 for locking up the supporting leg 21 with the vehicle frame 10. In other words, the locker member 23 and the biasing shoulder 2112 of the supporting leg 21 bias against the top and bottom securing shoulders 111, 112 of the through hole 11 in a sandwiched manner, as shown in FIG. 3, so as to prevent the inserting portion 21 of the supporting leg 21 from pulling out and pushing in from the through hole 11.

The independent wheel arrangement 20 further comprises a supporting shaft 24 downwardly extended from the seat frame 12 of the vehicle frame 10 wherein a bottom portion of the supporting shaft 24 is arranged to coaxially engage with the locker member 23 by coaxially inserting the bottom portion of the supporting shaft 24 into a coaxial through hole 2114 of the inserting portion 211 of the supporting leg 21, for evenly distributing a downward force of the rider's weight to the vehicle frame 10 so as to substantially support the supporting leg 21 on the vehicle frame 10. It is worth to mention that a downward force of a rider's weight is applied on the seat frame 12 can further enhance the coaxial engagement between the supporting shaft 24 and the locker member 23, so as to ensure the substantially support for the supporting leg 21.

As shown in FIG. 2, the supporting shaft 24 has a polygon cross section and, correspondingly, the coaxial through hole 2114 of the inserting portion 211 of the supporting leg 21 has a polygon cross section. Therefore, when the supporting shaft 24 is inserted into the coaxial though hole 2114 of the inserting portion 211 of the supporting leg 21, the supporting leg 21 is blocked from any axial rotation along the through hole 11 so as to prevent the supporting leg 21 rotating with respect to the vehicle frame 10. It is worth to mention that the supporting shaft 24 and the coaxial through hole 2114 of the inserting portion 211 of the supporting leg 21 can be constructed to have a hexagon or square cross section for providing the same rotation blocking function.

Figure 4:
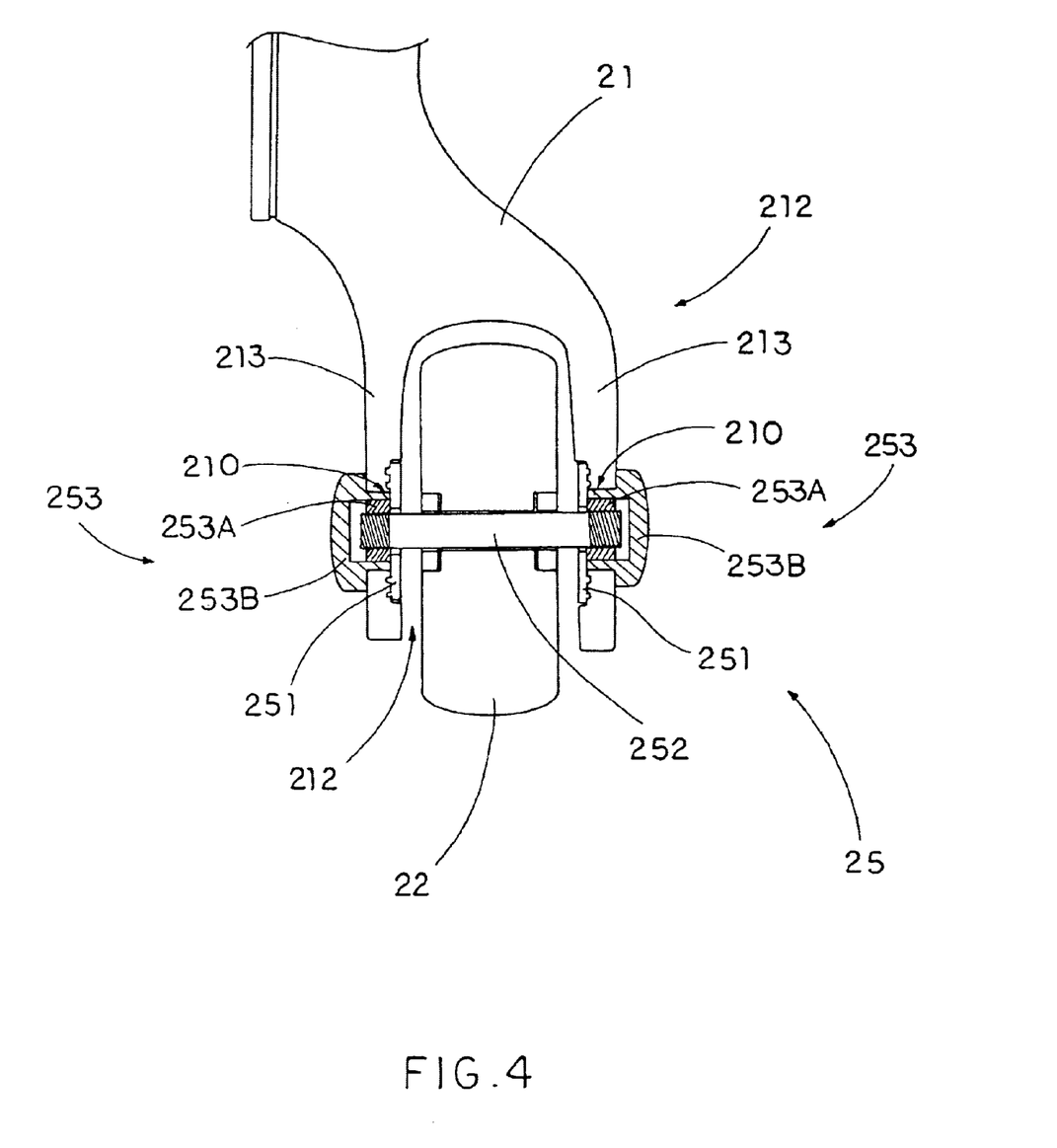
FIG. 4 is a sectional view of an axle unit of the independent wheel arrangement according to the above preferred embodiment of the present invention.

As shown in FIG. 4, the bottom end 212 of the supporting leg 21 has two sidewalls 213 to define a wheel cavity 212a therebetween in such a manner that the wheel 22 rotatably supported between the two sidewalls 213 of the supporting leg 21. Each of the sidewalls 213 has an axle through hole 210 transversely provided thereon for communicating the wheel cavity 212 with outside.

The independent wheel arrangement 20 further comprises an axle unit 25 for rotatably mounting the wheel 22 to the supporting leg 21 wherein the axle unit 25 comprises two reinforcing panels 251, each having a ring shaped, firmly mounted at inner surfaces of the two sidewalls 213 and coaxially aligning with the axle through holes 210 respectively, an axle shaft 252, having two threaded ends, passing through the two axle through holes 210, and two wheel lockers 253 affixing to the two threaded ends of the axle shaft 252 at outer surfaces of the two sidewalls 213 respectively in such a manner that each of the sidewalls 213 is securely sandwiched between the reinforcing panel 251 and the wheel locker 253 for preventing the sidewall 213 from bending outwardly.

According to the preferred embodiment, the two reinforcing panels 251 are made of rigid material such as metal and are embedded into the inner surfaces of the two sidewalls 213 respectively. Each of the wheel lockers 253 comprises a locker nut 253a, which are made of metal, securely screwed onto the respective threaded end of the axle shaft 252 at the outer surface of the sidewall 213 and a wheel cap 253b firmly covered on the respective outer surface of the sidewall 213 and adapted to protect the locker nut 253a, as shown in FIG. 4.

The independent wheel arrangement 20 further comprises a reinforcing unit 26 and a stress arm 27. The reinforcing unit 26 comprises at least a reinforcing ridge 261 integrally and radially extended from the inserting portion 211 of the supporting leg 21 and at least a ridge holder 262 integrally and radially formed at the through hole 11 of the vehicle frame 10 wherein the reinforcing ridge 261 is fittedly received in the ridge holder 262 when the inserting portion 211 of the supporting leg is inserted into the through hole 11.

Accordingly, the ridge holder 262 is embodied to form a guiding slot 262a downwardly extended from the bottom securing shoulder 112 and a ridge stopper 262b formed at a ceiling of the guiding slot 262a in such a manner that the reinforcing ridge 262 is slidably inserted into the guiding slot 262a while the ridge stopper 262b is adapted to limit an upward movement of the reinforcing ridge 262 along the guiding slot 262a.

As shown in FIG. 2, there are two reinforcing ridges 261 and two corresponding ridge holders 262 formed on the supporting leg 21 and the vehicle frame 10 respectively. Preferably, the two reinforcing ridges 261 are radially extended along the through hole 11 and perpendicular to each other. The reinforcing unit 26 is capable of not only locking up the supporting leg 21 with the vehicle frame 10 for blocking up the axially rotational movement of the inserting portion 211 of supporting leg 21 along the through hole 11 but also preventing the supporting leg 21 from bending outward when a downward force of the rider's weight is applied on the vehicle frame 10.

The stress arm 27 is transversely extended from the supporting leg 21 at a lower portion thereof wherein a free end of the stress arm 27 is adapted to firmly affix to the vehicle frame 10 so as to evenly distribute the stress from the supporting leg 21 to the vehicle frame 10. Preferably, the free end of the stress arm 27 is firmly affixed to an anti-flipping member 114 mounted underneath the vehicle frame 11 at a rear portion thereof so as to minimize the alternation of the structure of the vehicle frame 11, as shown in FIG. 5.

Figure 5:
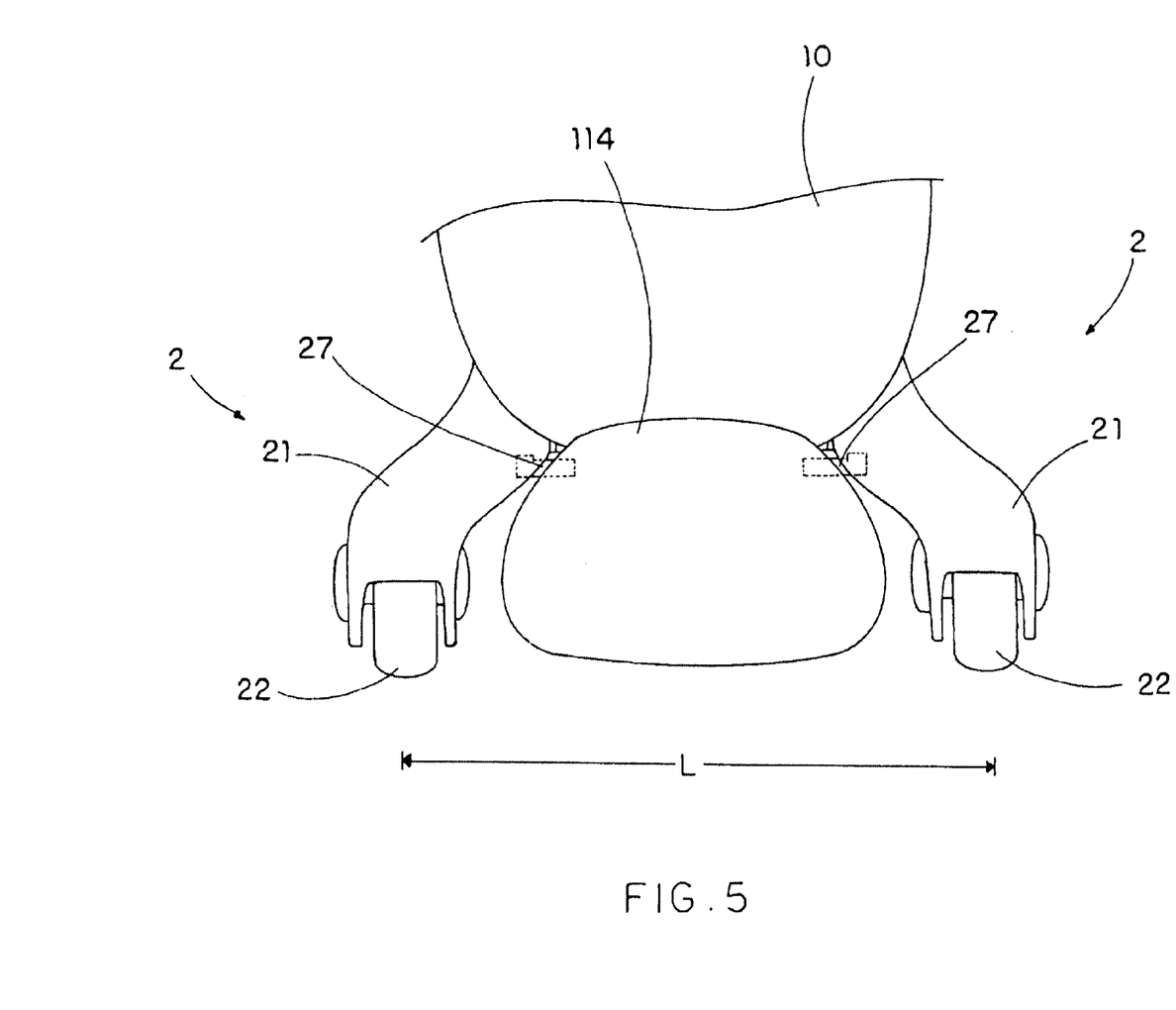
FIG. 5 is a rear view of the toy vehicle incorporated with the independent wheel arrangement according to the above preferred embodiment of the present invention.

As shown in FIG. 5, the toy vehicle 1 is employed with two independent wheel arrangements 2, wherein the two supporting legs 21 are outwardly extended from the vehicle frame 10 so as to maximize a wheel length L defined between the two wheels 22. As it is mentioned in the background, longer wheel length L can provide a better stabilization of the toy vehicle 1. However, when the downward force of the rider's weight is applied on the vehicle frame 10, two outward forces will be created to the supporting legs 21 respectively, which may bend the two wheels 22 outwardly. Therefore, the stress arm 27 can reinforce the respective supporting leg 21 in an outwardly bending manner by transferring the outward force back to the vehicle frame 10. In other words, the stress arm 27 can prevent the supporting leg 21 from being bent outwardly with respect to the vehicle frame 10.

Figure 6:
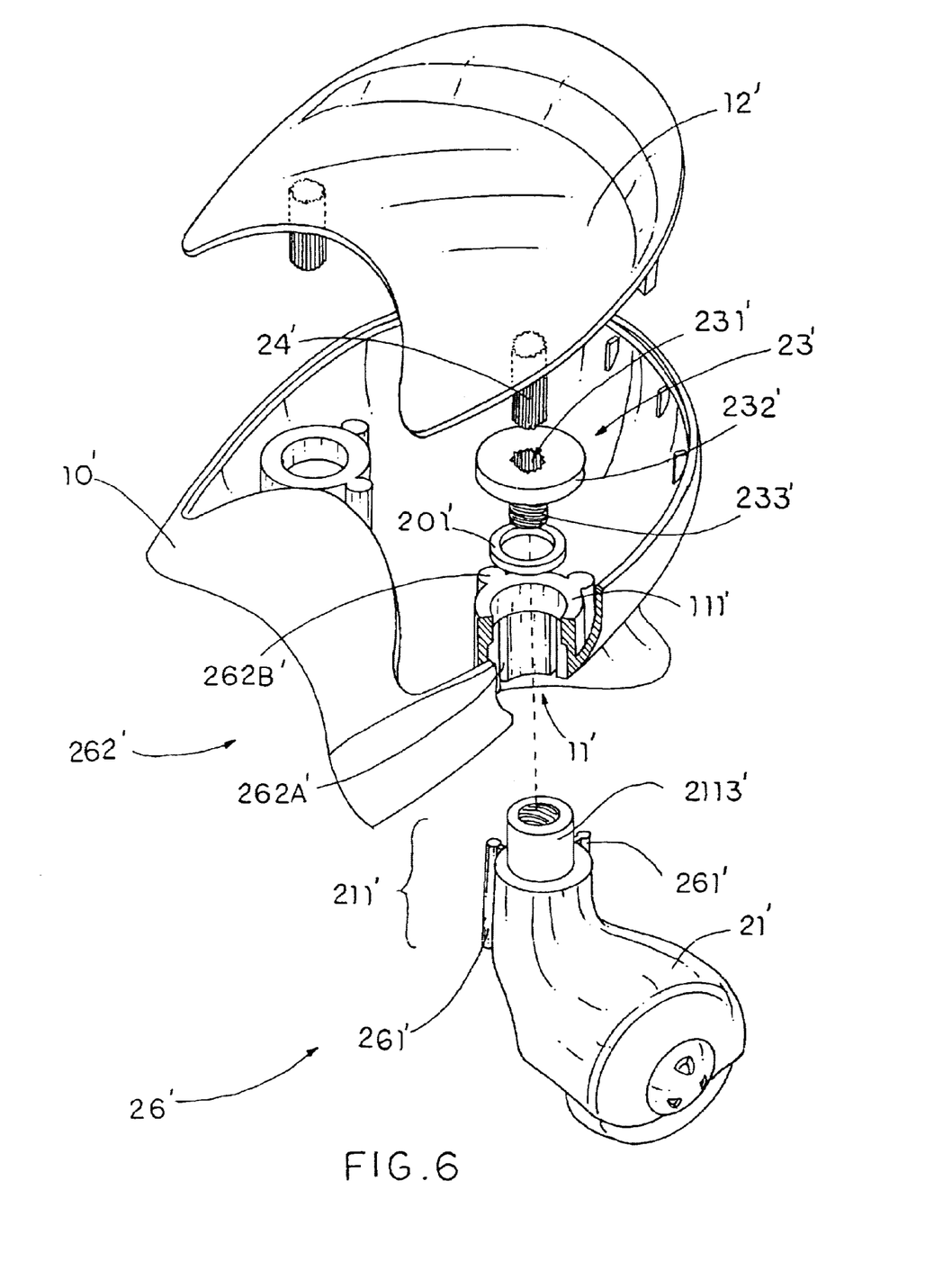
FIG. 6 is a first alternative mode of the locker member of the independent wheel arrangement for toy vehicle according to the above preferred embodiment of the present invention.

FIG. 6 illustrates a first alternative mode of the locker member 23' wherein the locker member 23' has an upper enlarged head portion 232' and a lower outer threaded tail portion 233' wherein the tail portion 233' of the locker member 23' is adapted to fittedly screwing into the shank portion 2113' of the inserting portion 211' of the supporting leg 21' at an inner surface thereof until the head portion 232' of the locker member 23' is biased against the top securing shoulder 111' of the through hole 11', so as to fasten the inserting portion 211' of the supporting leg 21' with the through hole 11'. Preferably, a washer 201' can be used wherein the washer 201' is securely sandwiched between the top securing shoulder 111' of the through hole 11' and the head portion 232' of the locker member 23'.

Moreover, the supporting shaft 24' is arranged to coaxially engage with the locker member 23' by coaxially inserting the bottom portion of the supporting shaft 24' into a coaxial hole 231' extended from the head portion 232' of the locker member 23' to the tail portion 233' thereof to substantially support the supporting leg 21' on the vehicle frame 10'. Accordingly, the supporting shaft 24' has a polygon cross section and the coaxial hole 231' of the locker member 23' has a corresponding polygon cross section in such a manner that when the supporting shaft 24' is inserted into the coaxial hole 231' of the locker member 23', the supporting leg 21' is blocked from any axial rotation along the through hole 11' so as to prevent the supporting leg 21' rotating with respect to the vehicle frame 10'.

Figure 7:
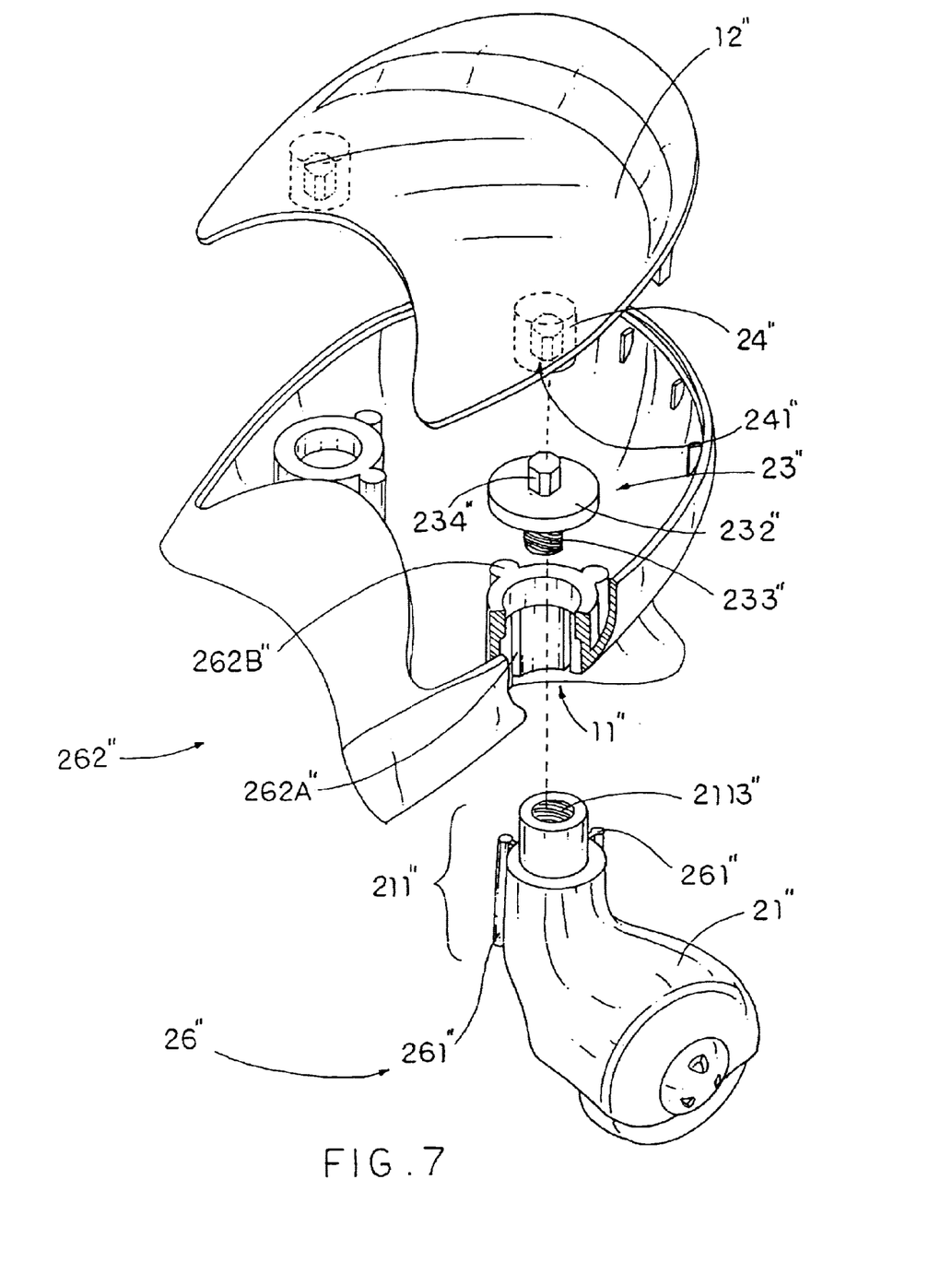
FIG. 7 is a second alternative mode of the locker member of the independent wheel arrangement mounted to the toy vehicle according to the above preferred embodiment of the present invention.

FIG. 7 illustrates a second alternative mode of the locker member 23" which further has an inserting projection 234" upwardly extended from the head portion 232" of the locker member 23" wherein the supporting shaft 24" is coaxially engaged with the locker member 23" by coaxially inserting the inserting projection 234' into a coaxial slot 241"of the supporting shaft 24" having a tubular structure, so as to substantially support the supporting leg 21" on the vehicle frame 10". The inserting projecting 234" has a polygon cross section and the coaxial hole 241" of the supporting shaft 24" has a corresponding polygon cross section, so as to block the supporting leg 21" from any axially rotational movement with respect to the supporting leg 21".

What is claimed is:

1. A toy vehicle, comprising:
   a vehicle frame having two through holes each provided a top securing shoulder and a bottom securing shoulder at two opening ends of said through hole;
   a seat frame mounted on said vehicle frame and positioned above said through hole;
   a steering unit, comprising a driving wheel, for steering a movement of said vehicle frame; and
   two independent wheel arrangements provided at two outer sides of said vehicle frame, each comprising:
   a supporting leg having an upper inserting portion and a bottom portion, wherein said inserting portion of said supporting leg has a base portion and a shank portion upwardly extended therefrom to define a biasing shoulder radially extended between said base portion and said shank portion, wherein said inserting portion of said supporting leg is fittedly inserted into said respective through hole until said biasing shoulder is biased against said bottom securing shoulder of said through hole, so as to hold said supporting leg within said through hole in position;
   a wheel rotatably mounted at said bottom portion of said supporting leg;
   a locker member securely attaching to said shank portion of said supporting leg with said through hole until said locker member is biased against said top securing shoulder of said tubular, so as to securely mount said supporting leg to said vehicle frame; and
   a supporting shaft downwardly extended from said seat frame wherein a bottom portion of said supporting shaft is coaxially engaged with said locker member so as to substantially support said supporting leg to said vehicle frame.

2. The toy vehicle, as recited in claim 1, wherein each of said independent wheel arrangements further comprises a reinforcing unit which comprises at least a reinforcing ridge integrally and radially extended from said inserting portion of said supporting leg and at least a ridge holder integrally and radially formed at said through hole of said vehicle frame wherein said reinforcing ridge is fittedly received in said ridge holder when said inserting portion of said supporting leg is inserted into said through hole.

3. The toy vehicle, as recited in claim 2, wherein said ridge has a guiding slot downwardly extended from said bottom securing shoulder and an ridge stopper formed at a ceiling of said guiding slot in such a manner that said reinforcing ridge is slidably inserted into said guiding slot while said ridge stopper is adapted to limit an upward movement of said reinforcing ridge along the guiding slot.

4. The toy vehicle, as recited in claim 2, wherein said locker member has a coaxial threaded hole for screwing onto said shank portion of said supporting leg at an outer surface thereof until said locker member biases against said top securing shoulder of said through hole so as to fasten said inserting portion of said supporting leg with said through hole for locking up said supporting leg with said vehicle frame.

5. The toy vehicle, as recited in claim 4, wherein said supporting shaft is coaxially engaged with said locker member by coaxially inserting said bottom end portion of said supporting shaft into a coaxial through hole of said shank portion of said supporting leg.

6. The toy vehicle, as recited in claim 2, wherein said locker member has an upper enlarged head portion and a lower outer threaded tail portion wherein said tail portion of said locker member is adapted to securely screwing into said shank portion of said supporting leg at an inner surface thereof until said head portion of said locker member is biased against said top securing shoulder of said through hole, so as to fasten said inserting portion of said supporting leg with said through hole.

7. The toy vehicle, as recited in claim 6, wherein said supporting shaft is coaxially engaged with said locker member by coaxially inserting said bottom end portion of said supporting shaft into a coaxial hole extended from said head portion of said locker member to said tail portion thereof, so as to substantially support said supporting leg on said vehicle frame.

8. The toy vehicle, as recited in claim 6, wherein said supporting shaft has a coaxial slot and said locker member further has an inserting projection upwardly extended from said head portion of said locker member, wherein said locker member is coaxially engaged with said supporting shaft by coaxially inserting said inserting projection into said coaxial slot of said supporting shaft at said bottom portion thereof, so as to substantially support said supporting leg on said vehicle frame.

9. The toy vehicle, as recited in claim 1, wherein said locker member has a coaxial threaded hole for screwing onto said shank portion of said supporting leg at an outer surface thereof until said locker member biases against said top securing shoulder of said through hole so as to fasten said inserting portion of said supporting leg with said through hole for locking up said supporting leg with said vehicle frame.

10. The toy vehicle, as recited in claim 9, wherein said supporting shaft is coaxially engaged with said locker member by coaxially inserting said bottom end portion of said supporting shaft into a coaxial through hole of said shank portion of said supporting leg.

11. The toy vehicle, as recited in claim 1, wherein said locker member has an upper enlarged head portion and a lower outer threaded tail portion wherein said tail portion of said locker member is adapted to securely screwing into said shank portion of said supporting leg at an inner surface thereof until said head portion of said locker member is biased against said top securing shoulder of said through hole, so as to fasten said inserting portion of said supporting leg with said through hole.

12. The toy vehicle, as recited in claim 11, wherein said supporting shaft is coaxially engaged with said locker member by coaxially inserting said bottom end portion of said supporting shaft into a coaxial hole extended from said head portion of said locker member to said tail portion thereof, so as to substantially support said supporting leg on said vehicle frame.

13. The toy vehicle, as recited in claim 11, wherein said supporting shaft has a coaxial slot and said locker member further has an inserting projection upwardly extended from said head portion of said locker member, wherein said locker member is coaxially engaged with said supporting shaft by coaxially inserting said inserting projection into said coaxial slot of said supporting shaft at said bottom portion thereof, so as to substantially support said supporting leg on said vehicle frame.

14. An independent wheel arrangement of a toy vehicle comprising a vehicle frame, comprising:

a top securing shoulder and a bottom securing shoulder of said toy vehicle, wherein a through hole is defined between said a top securing shoulder and said bottom securing shoulder;

the seat frame mounted on said vehicle frame and positioned above said through hole;

a supporting leg having an upper inserting portion and a bottom portion, wherein said inserting portion of said supporting leg has a base portion and a shank portion upwardly extended therefrom to define a biasing shoulder radially extended between said base portion and said shank portion, wherein said inserting portion of said supporting leg is fittedly inserted into said through hole until said biasing shoulder is biased against said bottom securing shoulder in order to hold said supporting leg within said through hole in position;

a wheel rotatably mounted at said bottom portion of said supporting leg; and a locker member securely attaching said shank portion of said supporting leg with said through hole until said locker member is biased against said top securing shoulder for securely mounting said supporting leg to the vehicle frame, wherein said locker member has a coaxial threaded hole for screwing onto said shank portion of said supporting leg at an outer surface thereof so as to fasten said inserting portion of said supporting leg with said through hole for locking up said supporting leg with the vehicle frame.

15. The independent wheel arrangement, as recited in claim 14, further comprising a supporting shaft which has a bottom portion coaxially engaged with said locker member by coaxially inserting said bottom end portion of said supporting shaft into a coaxial through hole of said shank portion of said supporting leg for substantially supporting said supporting leg to the vehicle frame while said supporting shaft is downwardly extended from the seat frame.

16. The independent wheel arrangement, as recited in claim 15, further comprising a reinforcing unit which comprises at least a reinforcing ridge integrally and radially extended from said inserting portion of said supporting leg and at least a ridge holder integrally and radially formed at said through hole wherein said reinforcing ridge is fittedly received in said ridge holder when said inserting portion of said supporting leg is inserted into said through hole.

17. The independent wheel arrangement, as recited in claim 16, wherein said ridge has a guiding slot downwardly extended from said bottom securing shoulder and a ridge stopper formed at a ceiling of said guiding slot in such a manner that said reinforcing ridge is slidably inserted into said guiding slot while said ridge stopper is adapted to limit an upward movement of said reinforcing ridge along said guiding slot.

18. The independent wheel arrangement, as recited in claim 16, further comprising a stress arm transversely extended from said supporting leg at a lower portion thereof for firmly affixing a free end of said stress arm to said vehicle frame so as to distribute a stress from said supporting leg to said vehicle frame.

19. An independent wheel arrangement of a toy vehicle comprising a vehicle frame and a seat frame mounted on the vehicle frame, comprising:

a top securing shoulder and a bottom securing shoulder of said toy vehicle, wherein a through hole is defined between said a top securing shoulder and said bottom securing shoulder;

a supporting leg having an upper inserting portion and a bottom portion, wherein said inserting portion of said supporting leg has a base portion and a shank portion upwardly extended therefrom to define a biasing shoulder radially extended between said base portion and said shank portion, wherein said inserting portion of said supporting leg is fittedly inserted into said through hole until said biasing shoulder is biased against said bottom securing shoulder in order to hold said supporting leg within said through hole in position;

a wheel rotatably mounted at said bottom portion of said supporting leg; and a locker member securely attaching said shank portion of said supporting leg with said through hole until said locker member is biased against said top securing shoulder for securely mounting said supporting leg to the vehicle frame, wherein said locker member has an upper enlarged head portion and a lower outer threaded tail portion wherein said tail portion of said locker member is arranged to securely screwing into said shank portion of said supporting leg at an inner surface thereof until said head portion of said locker member is biased against said top securing shoulder of said through hole, so as to fasten said inserting portion of said supporting leg with said through hole.

20. The independent wheel arrangement, as recited in claim 19, wherein said supporting shaft is coaxially engaged with said locker member by coaxially inserting said bottom end portion of said supporting shaft into a coaxial hole extended from said head portion of said locker member to said tail portion thereof for substantially supporting said supporting leg on said vehicle frame.

21. The independent wheel arrangement, as recited in claim 20, further comprising a reinforcing unit which comprises at least a reinforcing ridge integrally and radially extended from said inserting portion of said supporting leg and at least a ridge holder integrally and radially formed at said through hole wherein said reinforcing ridge is fittedly received in said ridge holder when said inserting portion of said supporting leg is inserted into said through hole.

22. The independent wheel arrangement, as recited in claim 21, wherein said ridge has a guiding slot downwardly extended from said bottom securing shoulder and a ridge stopper formed at a ceiling of said guiding slot in such a manner that said reinforcing ridge is slidably inserted into said guiding slot while said ridge stopper is adapted to limit an upward movement of said reinforcing ridge along said guiding slot.

23. The independent wheel arrangement, as recited in claim 21, further comprising a stress arm transversely extended from said supporting leg at a lower portion thereof for firmly affixing a free end of said stress arm to said vehicle frame so as to distribute a stress from said supporting leg to said vehicle frame.

24. The independent wheel arrangement, as recited in claim 20, wherein said supporting shaft has a polygon cross section and said coaxial hole of said locker member has a corresponding polygon cross section in such a manner that said supporting leg is blocked from an axial rotation along said through hole when said supporting shaft is inserted into said coaxial through hole of said inserting portion of said supporting leg.

25. The independent wheel arrangement, as recited in claim 19, wherein said supporting shaft has a coaxial slot and said locker member further has an inserting projection upwardly extended from said head portion of said locker member, wherein said locker member is coaxially engaged with said supporting shaft by coaxially inserting said inserting projection into said coaxial slot of said supporting shaft at said bottom portion thereof for substantially supporting said supporting leg on said vehicle frame.

26. The independent wheel arrangement, as recited in claim 25, wherein said inserting projection has a polygon cross section and said coaxial hole of said supporting shaft has a corresponding polygon cross section in such a manner that said supporting leg is blocked from an axial rotation along said through hole when said inserting projection is inserted into said coaxial slot of said supporting shaft.

27. The independent wheel arrangement, as recited in claim 25, further comprising a reinforcing unit which comprises at least a reinforcing ridge integrally and radially extended from said inserting portion of said supporting leg and at least a ridge holder integrally and radially formed at said through hole wherein said reinforcing ridge is fittedly received in said ridge holder when said inserting portion of said supporting leg is inserted into said through hole.

28. The independent wheel arrangement, as recited in claim 27, wherein said ridge has a guiding slot downwardly extended from said bottom securing shoulder and a ridge stopper formed at a ceiling of said guiding slot in such a manner that said reinforcing ridge is slidably inserted into said guiding slot while said ridge stopper is adapted to limit an upward movement of said reinforcing ridge along the guiding slot.

29. The independent wheel arrangement, as recited in claim 27, further comprising a stress arm transversely extended from said supporting leg at a lower portion thereof for firmly affixing a free end of said stress arm to said vehicle frame so as to distribute a stress from said supporting leg to said vehicle frame.

30. An independent wheel arrangement of a toy vehicle comprising a vehicle frame and a seat frame mounted on the vehicle frame, comprising:

a top securing shoulder and a bottom securing shoulder of said toy vehicle, wherein a through hole is defined between said a top securing shoulder and said bottom securing shoulder;

a supporting leg having an upper inserting portion and a bottom portion, wherein said inserting portion of said supporting leg has a base portion and a shank portion upwardly extended therefrom to define a biasing shoulder radially extended between said base portion and said shank portion, wherein said inserting portion of said supporting leg is fittedly inserted into said through hole until said biasing shoulder is biased against said bottom securing shoulder in order to hold said supporting leg within said through hole in position;

a wheel rotatably mounted at said bottom portion of said supporting leg;

a locker member securely attaching said shank portion of said supporting leg with said through hole until said locker member is biased against said top securing shoulder for securely mounting said supporting leg to the vehicle frame; and a reinforcing unit which comprises at least a reinforcing ridge integrally and radially extended from said inserting portion of said supporting leg and at least a ridge holder integrally and radially formed at said through hole wherein said reinforcing ridge is fittedly received in said ridge holder when said inserting portion of said supporting leg is inserted into said through hole.

31. The independent wheel arrangement, as recited in claim 30, wherein said ridge has a guiding slot downwardly extended from said bottom securing shoulder and a ridge stopper formed at a ceiling of said guiding slot in such a manner that said reinforcing ridge is slidably inserted into said guiding slot while said ridge stopper is adapted to limit an upward movement of said reinforcing ridge along the guiding slot.

* * * * *